United States Patent
Matthews et al.

[11] Patent Number: 5,983,719
[45] Date of Patent: Nov. 16, 1999

[54] LOW QUANTIZATION METHOD AND APPARATUS FOR VIBRATORY ROTATION SENSORS

[75] Inventors: Anthony Matthews, Santa Barbara; Peter K. Tseng, Canoga Park; Guy T. Varty, Woodland Hills, all of Calif.

[73] Assignee: Litton Systems, Inc., Woodlands Hills, Calif.

[21] Appl. No.: 08/993,499

[22] Filed: Dec. 18, 1997

Related U.S. Application Data

[60] Provisional application No. 60/054,361, Jul. 31, 1997.
[51] Int. Cl.$^6$ .................................................. G01P 9/04
[52] U.S. Cl. ............................... 73/504.13; 702/145
[58] Field of Search ........................... 73/504.13, 504.12, 73/504.04; 701/220; 702/145

[56] References Cited

U.S. PATENT DOCUMENTS 5,801,310  9/1998  Matthews et al. ................... 73/504.13

*Primary Examiner*—John E. Chapman
*Attorney, Agent, or Firm*—Price, Gess & Ubell

[57] ABSTRACT

In a vibrating rotation sensor of the hemispherical resonator gyro type (HRG), operating in the whole angle mode wherein the standing-wave components are measured to provide a measure of the pattern angle, the digital signal processor functions to control the digital to analog converter output signal in order to keep the highly amplified analog to digital input signal, the difference between the pattern angle and excitation angle, within the analog to digital converter window. The analog to digital converter window is set at n times the discrete level of the digital to analog converter. A digital feedback loop in the digital signal processor continually corrects the tracking angle to control the excitation voltage.

17 Claims, 4 Drawing Sheets

5,983,719

LOW QUANTIZATION METHOD AND APPARATUS FOR VIBRATORY ROTATION SENSORS

CROSS REFERENCED TO RELATED APPLICATION

This application claims benefit of of Provisional Application Ser. No. 60/054,361 filed on Jul. 31, 1997 for LOW QUANTISATION METHOD AND APPARATUS FOR VIBRATORY ROTATION SENSORS.

BACKGROUND OF THE INVENTION

1. Field of the Invention

This invention relates to a class of vibratory rotation sensors in which the vibrating members are thin-walled axisymmetric hemispherical shells, and more specifically pertains to the control electronics for such a sensor.

2. Description of Related Art

A prior art vibratory rotation sensor 10 is illustrated in FIG. 1, as having an outer member 12, a hemispherical resonator 14, and an inner member 16, all of which are made of fused quartz and are joined together with indium. This particular type of vibratory rotation sensor which has a vibrating member 14 that is a thin-walled axisymmetric hemispherical shell is known as a hemispherical resonator gyro (HRG).

The inertially sensitive element in the HRG is the hemispherical resonator 14, usually a thin-walled 5.8 cm diameter bell-shaped object positioned between the outer member 12 and the inner member 16 and supported between the inner and outer members by a stem 26.

The thin-walled axisymmetric hemispherical shell 14 oscillates in one of its lower flexing modes which takes the form of a standing wave. The standing wave which exists around the rim of the shell resonator 14, is shown in the two extremes 26 and 28 of its oscillatory deformation in FIGS. 2 and 3.

The elliptical standing wave contains four antinodes and four nodes. The antinodes and nodes are separated from one another by 45°. The rotation sensitivity of the standing wave results from the fact that each mass element of the shell undergoing oscillation acts much like a Foucault pendulum attempting to keep the direction of its linear momentum fixed in inertial space when the shell rotates about its axis. The resulting Coriolis forces, the product of the shell's vibratory motion and the inertial input rate causes the standing wave to precess with respect to the shell. The ratio of the standing wave precession angle to the inertial input rotation angle is known as the angular gain of the gyro.

In operation, forces are required to control the standing wave on the shell resonator 14. These forces are quasi-electrostatic in nature. In the case of the HRG in FIG. 1, a number of electrodes 22 are metalized on the inside surface 20 of the outer housing 12 which is concentric with the hemispherical shell resonator 14. The outer surface of the shell resonator 14 is metalized so that when the device is assembled, the electrodes in the outer housing 12 together with the surface of the resonator they face form a series of forcing electrostatic capacitors. Voltage is applied to the appropriate combinations of these electrodes to control the amplitude of the standing wave and to suppress unwanted quadrature effects.

Rotation of the HRG 10 about an axis normal to the plane of the rim 34 of shell resonator 14 causes the standing wave to rotate in the opposite direction with respect to the HRG by an angle proportional to the angle of rotation of the HRG 10. Thus, by measuring the angle of rotation of the standing wave with respect to the HRG 10, one can determine the angle of rotation of the HRG 10.

The vibrational mode of the shell resonator 14 is excited by placing a DC bias voltage on the resonator and an AC voltage on the forcing electrodes 20. The frequency of the AC voltage is usually twice the resonant frequency of the hemispherical shell resonator 14.

Readout signals from the HRG containing information about the amplitude and location of the standing wave on the shell resonator 14 are also obtained capacitively. Capacitor readout electrodes 24 are formed by metalized interior surface 30 of the shell resonator 14 and a plurality of electrodes 24 which are located on an inner concentric housing held in close proximity to the inner metalized shell resonator 14. Because of the shell's oscillating deformation the capacitance of each of the electrodes 24 is modulated at the resonator flexing frequency. Electronic readout circuits measure these capacitance changes and hence the location and amplitude of the standing wave is determined.

Additional and more specific details of vibratory rotation sensors can be found in U.S. Pat. No. 4,951,508 issued to Loper, Jr., et al. on Aug. 28, 1990, the entire disclosure thereof being incorporated herein.

Eight electrodes 24 (FIG. 1) are usually metalized on the surface of the pick-off assembly. These eight electrodes schematically illustrated as 30 and 32 in FIGS. 2 and 3 are connected together to form two sets of four. Each group 30 and 32 of four electrodes measures the amplitude of the standing wave pattern over the electrodes. Output from the group one electrodes 30, pick-off axis No. 1 is:

PO1 (pick-off axis No. 1)=A cos. (2 PA)

Output from the group 2 electrodes 32, pick-off axis No. 2 is:

PO2 (pick-off axis No. 2)=A Sin (2 PA)

The pattern angle (PA) is computed from $^{PO2}/_{PO1}$=Tan. (2 PA).

There are two methods of operating the HRG. The force to rebalance method (FTR) and the whole angle method (WA). In the force to rebalance method, an electrostatic force is applied to the resonator to lock the pattern angle around zero. When the pattern angle is close to zero the output of the pick-off axis PO1=A cos. (2 PA)=A and PO2=A sin. (2 PA)=A (2 PA).

Because PO2 is a small signal, a large gain may be applied to the signal to increase resolution and sensitivity of the HRG.

In the whole angle method of operation applied inertial rate causes the pattern 26 to move relative to the pickoff axis 34 to a new position 36 (FIG. 2). This difference 38 is the pattern angle PA. The output signals PO1 and PO2 from the two groups of electrodes must be scaled to handle larger signals. Measuring the standing wave components along the pickoffs and then taking the arc tangent of the ratio of their amplitudes provides a measure of the pattern angle PA 38.

In the whole angle tracking mode of operation shown in FIG. 4, the digital signal processing control 52 controls the AC excitation voltages 50 so that the readout signals from the resonator 41 are proportional to the motion at the standing wave nodes and antinodes.

Further detail about whole angle tracking mode of operation can be obtained by reference to co-pending patent application U.S. Ser. No. 802,009 titled Vibratory Rotation Sensor With Whole-Angle Tracking by Matthews, Varty, Li and Lynch, U.S. Pat. No. 5,801,310, granted Sep. 1, 1998.

A circuit for accomplishing this operation is illustrated in FIG. 4 as having the HRG 40 with its resonator 41 and Group 1 and Group 2 electrodes 43. The standing wave components in this case are measured from the resonator 41 by way of an AC buffer 42. The standing way components are processed by an axis 1 processor 44 and an axis 2 processor 46. The resulting signals are supplied to an analog to digital converter (ADC) 48. The digital form of a resultant signal is supplied to digital signal processing control 52 which provides the pattern angle output on line 54 and a feedback excitation signal 50 to the excitation electrodes 43. A computer-generated excitation angle is servoed to the pattern angle. As a result, the signal can be amplified with very high gain to obtain a low-noise high accuracy readout signal without sacrificing excellent scale factor performance over a wide dynamic field.

When operated in the whole angle mode, the HRG possesses a high dynamic rate capability. However, many precision pointing and tracking control applications require low noise. The digitization of the whole angle mode readout introduces significant angle quantization noise; for example, approximately four arc seconds for a 16-bit ADC. In precision pointing applications, the quantization noise present must be reduced by a factor of greater than 1,000. This requires an analog to digital converter greater than 26 bits. Such analog to digital converters are presently not practical.

The whole angle tracking mode of operation as discussed above reduces the analog to digital converter bit requirement by forming a small error signal that is quantizable by a 12 to 16 bit analog to digital converter. In the whole angle tracking mode, high dynamic rate, low noise angle readout is achieved by slewing a set of electrically computed readout excitation signals. These signals, however, require a digital to analog converter (DAC) which again produces large angle quantization noise which must be corrected.

SUMMARY OF THE INVENTION

The objects and the general purpose of the invention are accomplished by an apparatus and method for synchronizing the quantization of the digital to analog converter output that generates the HRG excitation signals, with the quantization of the analog to digital converter that outputs the pattern angle (PA) to the digital signal processor. The analog to digital converter window is set at a factor m larger than the discrete level of the digital to analog converter. A digital feedback loop senses a large analog to digital converter output and corrects the HRG tracking signals so that the difference between the pattern angle and tracking angle signals are always kept small and within the analog to digital converter window.

BRIEF DESCRIPTION OF THE DRAWINGS

The exact nature of this invention, as well as its objects and advantages, will be readily apparent as the same becomes better understood by reference to the following detailed description when considered in conjunction with the accompanying drawings, in which like reference numerals designate like parts throughout the figures thereof, and wherein.

DESCRIPTION OF THE PREFERRED EMBODIMENTS

Figure 1:
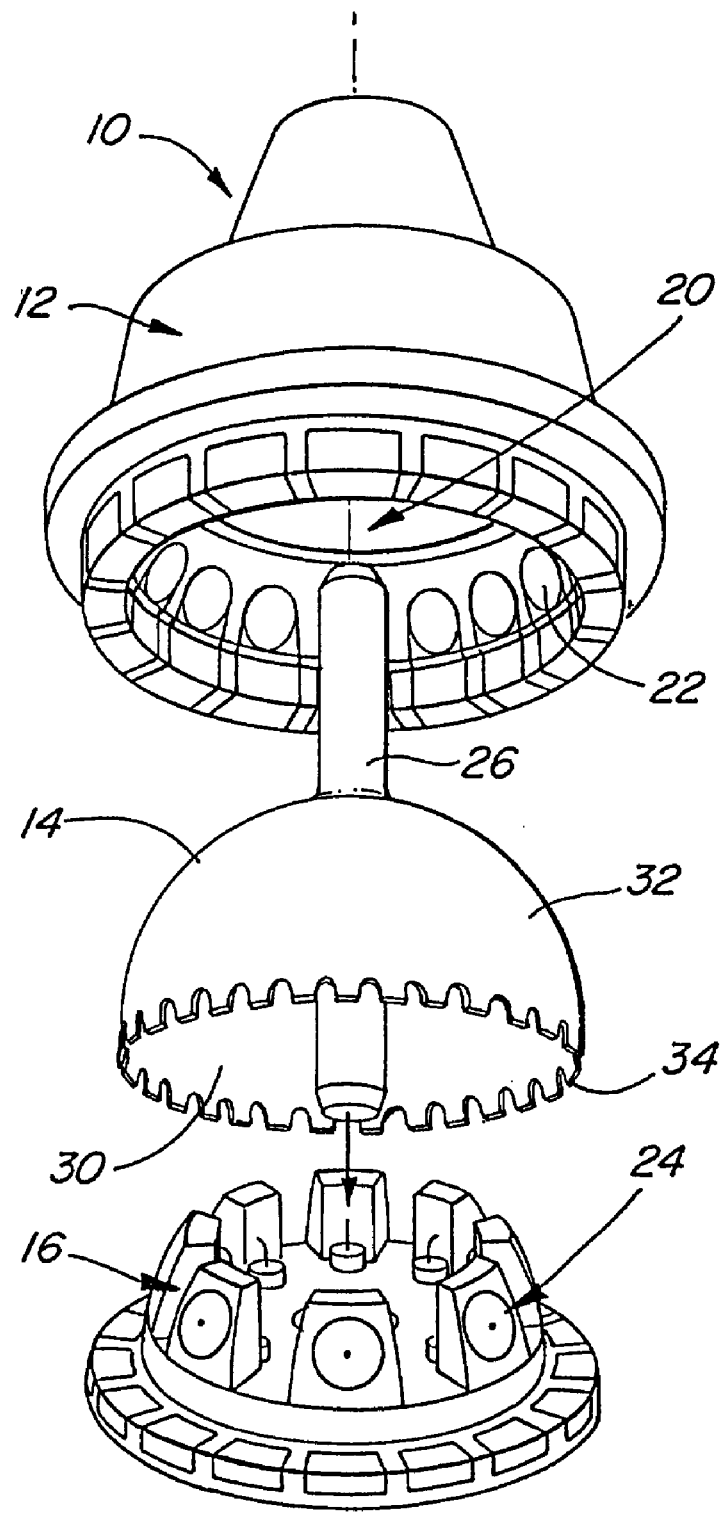
FIG. 1 is a blown-up perspective drawing of the basic elements of a prior art HRG.
Figure 2:
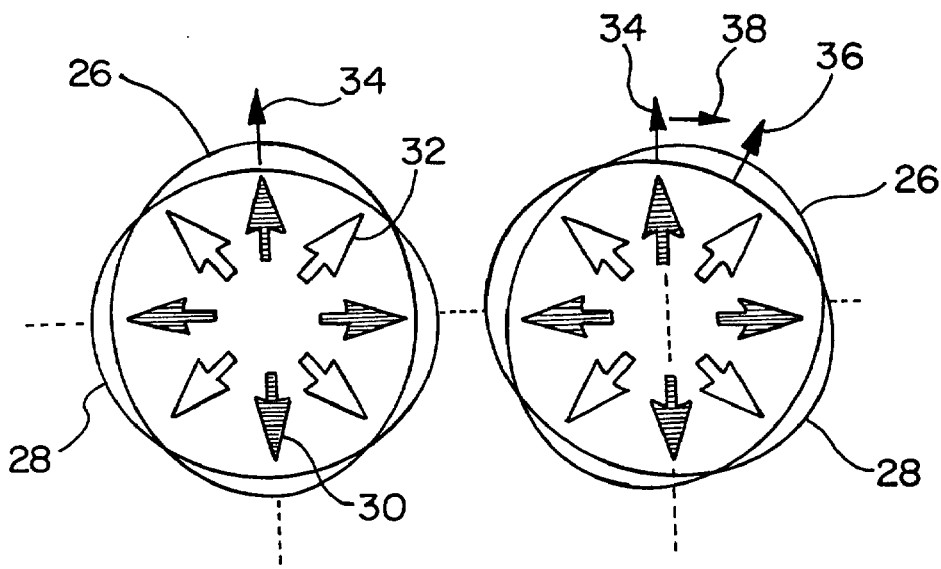
FIG. 2 is a schematic illustration of the standing waves on the resonator of an HRG.
Figure 3:
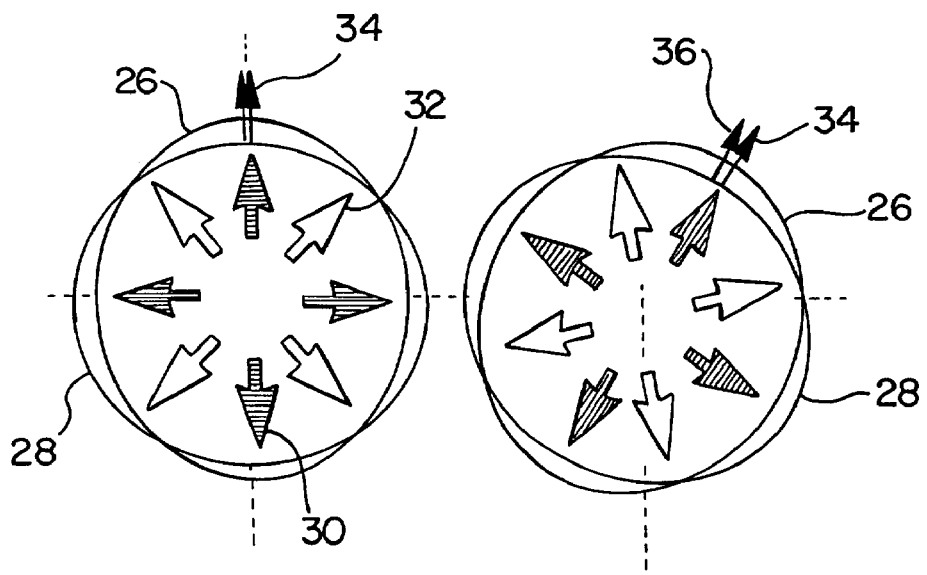
FIG. 3 is a schematic representation of standing waves on the resonator of an HRG.
Figure 4:
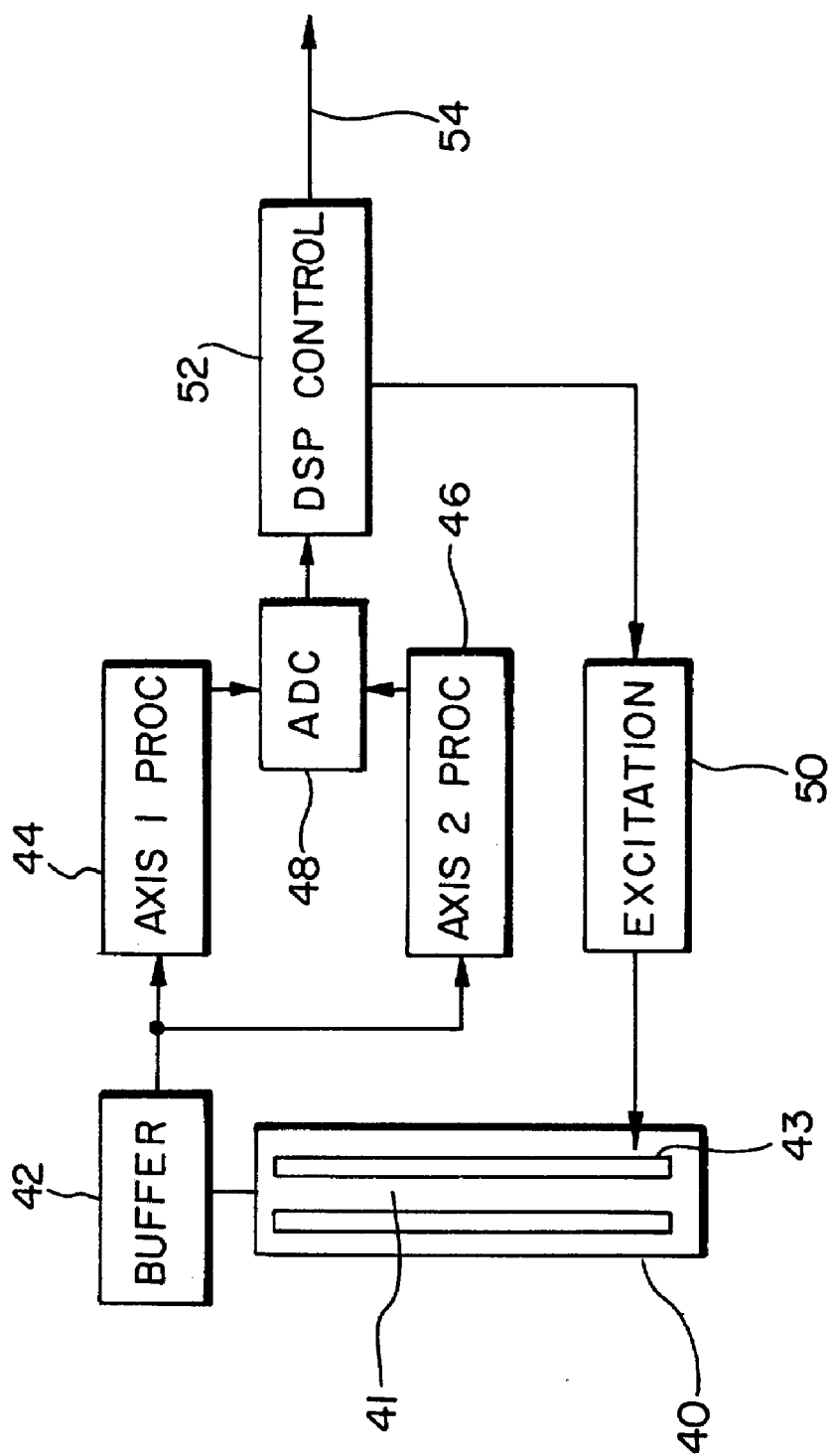
FIG. 4 is a block diagram of control circuitry for an HRG.
Figure 5:
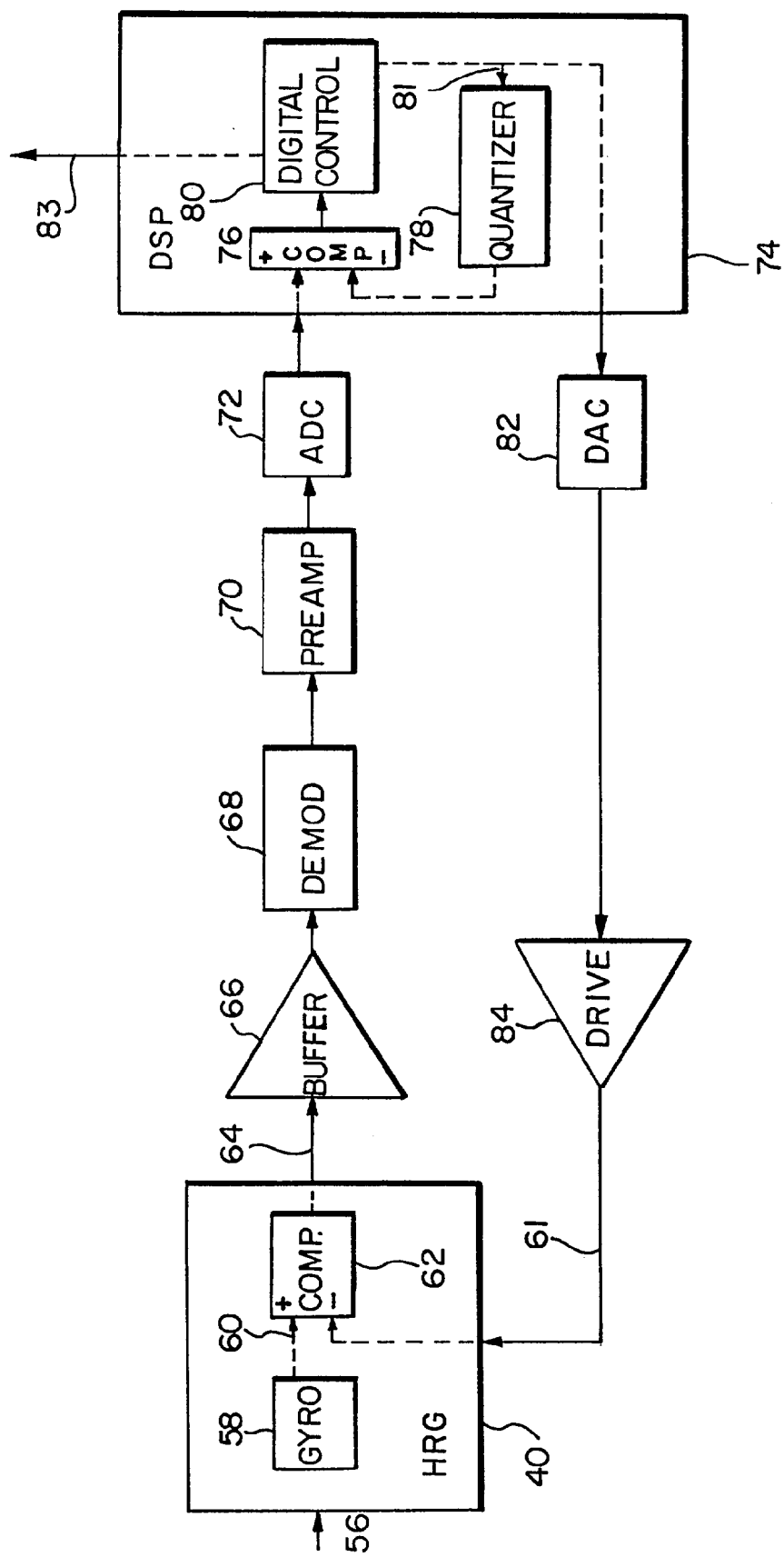
FIG. 5 is a block diagram of the control circuitry of the present invention.

The present invention achieves low quantization noise levels by synchronizing the quantization operation of a digital to analog converter 82 with the quantization operation of the analog to digital converter 72.

The HRG 40 can be thought of as a device that accepts two basic inputs, an inertial rate 56 which is integrated by the gyro 58 into a pattern angle $\theta_p$ 60. The second input is an excitation signal representing the excitation angle 61.

The function of the whole angle tracking mechanism is to change the excitation angle $\theta_e$ 61 to follow the pattern angle $\theta_p$ 60. If the difference between the pattern angle $\theta_p$ and the excitation angle $\theta_e$ is made small, as determined by difference comparator 62 then a small difference signal will result at output 64 and be supplied by buffer 66 and demodulator 68, which removes the RF carrier, to the input of a preamplifier 70. Because the signal is small, a high gain can be used in preamplifier 70 prior to quantization of the signal by analog to digital converter (ADC) 72.

Assume that the whole angle tracking mode is operating correctly, that the difference between the pattern angle $\theta_p$ and that the excitation angle $\theta_e$ is small, as the pattern angle changes continuously in a linear manner and the excitation angle is continuously updated to follow the pattern angle. The excitation angle $\theta_E$ being supplied on line 61 to comparator 62, however, is being generated by digital to analog converter (DAC) 82 and is therefore quantized. The quantization by the DAC 82 limits the ability of the feedback loop to maintain the input to preamp 70 at a small signal. Normally digital to analog converter quantization is equivalent to 80 arc seconds per bit. Thus, if too high a gain is utilized in preamp 70, the amplified signal supplied to the analog to digital converter 72 will be outside of its window, causing a large noise impulse to be processed by the digital signal processor 74.

The amplified signal being input to analog to digital converter 72 must be kept within the window of analog to digital converter 72 to avoid these large noise impulses. In order to ensure that the amplified signal supplied by preamp 70 to analog to digital converter 72 is within the ADC window, it is preferred that the ADC window is set at $N_W$ times the digital to analog converter discrete level, $N_W$ being an integer such as 1 or 2, for example. A preferred embodiment has the ADC window set at 2 discrete levels of the DAC 82.

The total quantization of the readout signal $(\theta_p - \theta_e)$ on line 64 being input to preamp 70 can be calculated from the formula.

$$\theta_T = \theta_{ADC} + \theta_{DAC}$$

-continued $$= N_1 + (N_2 - N_W)$$

Where:

$\theta_T$ is total quantization of the readout signal, $\theta_{ADC}$ is quantization of the analog to digital converter, $N_1$ is the number of bits for the analog to ditital converter, and $N_2$ is the number of bits for the digital to analog converter.

For a 12-bit digital to analog converter and a 12-bit analog to digital converter, $\theta_T=12+(12-2)=22$ bits. For a 16 bit digital to analog converter and a 16 bit analog to digital converter, $\theta_T=16+(16-2)=30$ bits.

With 30 bits of quantization in a high precision pointing application such as in the Hubble Space Telescope, this system would provide a quantization level of $2^{-30}$ rads which equals 0.00019 arc seconds.

In order to ensure that the output of analog to digital converter 72 does not cause the introduction of a large impulse signal into digital signal processor 74, the output signals of analog to digital converter 72 are compared in comparator 76 with excitation angle values stored in quantizers 78 which were previously calculated by digital control 80. Digital control 80 generates a signal on line 83 that indicates the slope or rate of change of the pattern angle (PA) and generates a signal on line 81 that indicates the excitation or tracking angle. The excitation angle signal is also supplied as an input to DAC 82 and through drivers 84 to the HRG 40. If a high impulse signal is received by comparator 76, the excitation angle signals output by control 80 will remain at previous levels.

What is claimed is:

1. In a vibrating rotation sensor having a rotationally symmetric thin-walled resonator which is capable of vibrating in at least one of a plurality of standing-wave modes, the orientation of a standing-wave with respect to a sequence point on the resonator being specified by a pattern angle, said sensor having a digital signal processor that generates an excitation angle with respect to the reference points on the resonator, and a comparator for comparing the pattern angle with the excitation angle to provide a difference signal, control apparatus for reducing the quantization noise in the electronics for the sensor comprising:

a digital to analog converter that outputs excitation angle signals to the comparator in said sensor;

an analog to digital converter that has a window for input signals set at n (n being a whole number) times the discrete quantization levels of said digital to analog converter, and receives the difference signals from the comparator; and feedback means for correcting the quantized output of the analog to digital converter to keep the difference signal input to the analog to digital converter within its window.

2. The control apparatus of claim 1 wherein said analog to digital converter window is set at four discrete levels of said digital to analog converter.

3. The control apparatus of claim 1 wherein said analog to digital converter is a twelve-bit converter and said digital to analog converter is a twelve-bit converter.

4. The control apparatus of claim 1 wherein said analog to digital converter is a sixteen-bit converter and said digital to analog converter is a sixteen-bit converter.

5. The control apparatus of claim 1 wherein said analog to digital converter is in the range of a twelve-to-sixteen bit converter and said digital to analog converter has the same number of bits as the analog to digital converter.

6. The control apparatus of claim 1 wherein said feedback means comprises:

a comparing means for comparing the output of the analog to digital converter to a previously generated excitation angle signal and providing a difference correction signal; and a control means receiving the signal from said comparing means and generating an excitation angle signal as the input to said digital to analog converter.

7. The control apparatus of claim 6 wherein said feedback means further comprises:

a quantization means for receiving the excitation angle signals from said control means and supplying previously generated excitation angle signals to said comparing means.

8. The control apparatus of claim 7 wherein said analog to digital converter has its window set at four discrete levels of said digital to analog converter.

9. The control apparatus of claim 7 wherein said analog to digital converter is a twelve-bit converter and said digital to analog converter is a twelve-bit converter.

10. The control apparatus of claim 7 wherein said analog to digital converter is a sixteen-bit converter and said digital to analog converter is a sixteen-bit converter.

11. In a vibrating rotation sensor having a rotationally-symmetrical thin-walled resonator which is capable of vibrating in at least one of a plurality of standing-wave modes, the orientation of a standing-wave with respect to a reference point on the resonator being specified by a pattern angle, said sensor having a digital processor for generating an excitation angle with respect to the reference point on the resonator, a method for reducing the quantization noise in the electronics for the sensor, comprising the steps of:

converting the excitation angle signals from said digital signal processor to analog signals;

comparing the analog excitation angle signals with the pattern angle signals from said sensor and forming analog difference signals;

converting the analog difference signals to digital signals; and correcting the digital difference signals so the analog difference signals remain within a certain range.

12. The method of claim 11 wherein the digital to analog converting step and the analog to digital converting step utilize the same number of quantization levels.

13. The method for claim 12 wherein the quantization levels for both said converting steps is twelve.

14. The method of claim 12 wherein the quantization levels for both said converting steps is sixteen.

15. The method of claim 12 wherein the quantization levels for both said converting steps is in the range between twelve and sixteen.

16. The method of claim 12 wherein said correcting step, comprises the steps of:

comparing the digital difference signal with a previously generated excitation angle signal and providing a difference correction signal; and generating an excitation angle signal upon receiving the difference correction signal.

17. The method of claim 16 wherein said correcting step further comprises the step of:

storing received excitation angle signals as they are generated and supplying stored excitation angle signals to be compared with the digital differences signal.

5,983,719

7

\* \* \* \* \*

8